Patented Oct. 8, 1929

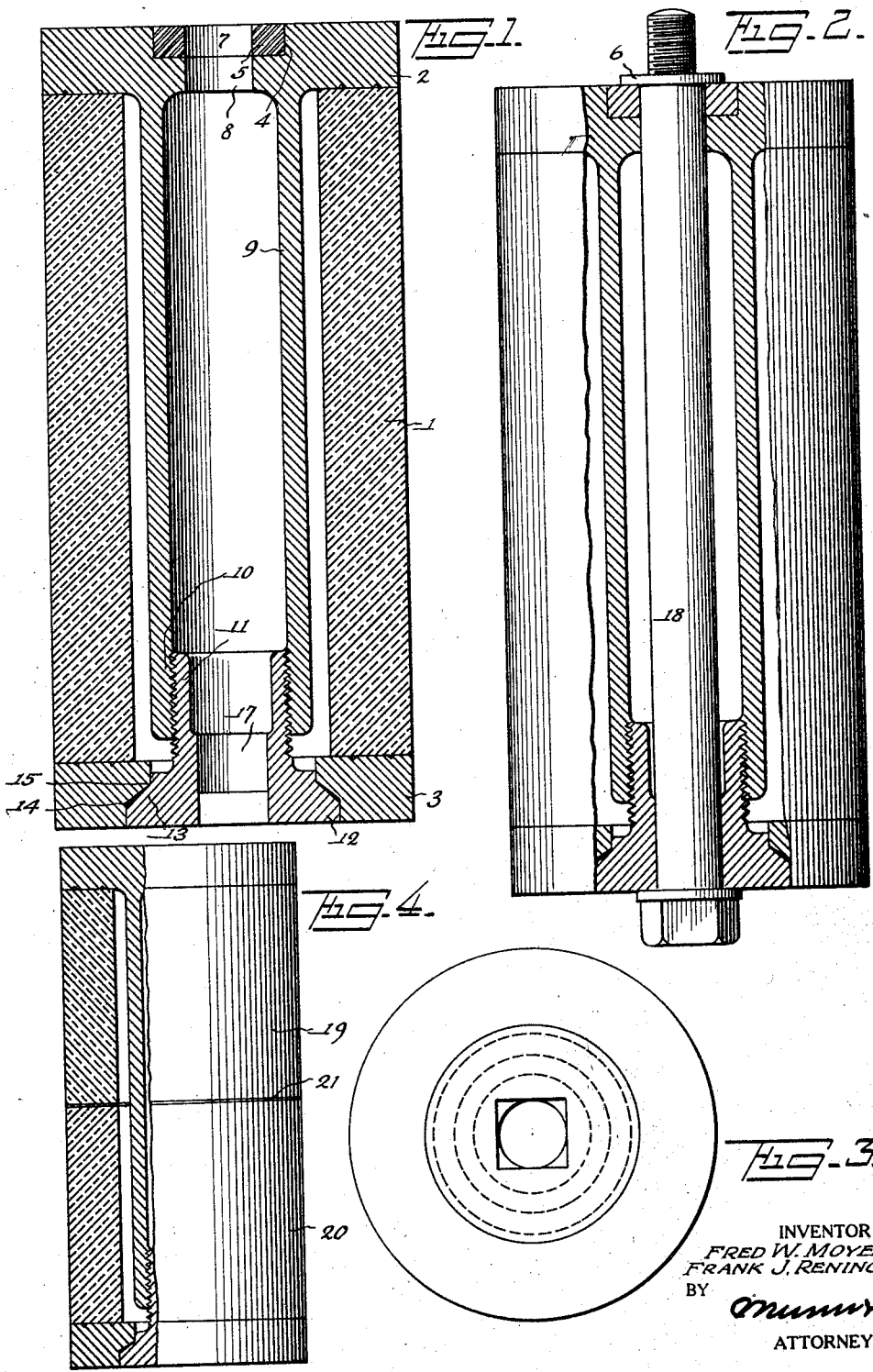

1,731,147

UNITED STATES PATENT OFFICE

FRED W. MOYER AND FRANK J. RENINGER, OF ALLENTOWN, PENNSYLVANIA, ASSIGNORS TO THE ALDRICH PUMP COMPANY, OF ALLENTOWN, PENNSYLVANIA, A CORPORATION OF PENNSYLVANIA

PUMP PLUNGER

Application filed June 25, 1927. Serial No. 201,373.

This invention relates to pump plungers adapted for different purposes, but particularly adapted for pump plungers employed in mines for removing mine water and other liquids.

The object of the invention is to provide an improved plunger which is simple in construction and which is very efficient in operation.

A further object of the invention is to provide an improved pump plunger wherein the main part of the plunger is formed of vitreous material and the metal parts formed of acid resisting metal.

A further object of the invention is to provide a pump plunger which may be termed a built-up plunger arranged in a number of parts and firmly clamped together so as to present in effect an integral plunger structure.

In the accompanying drawing—

Figure 1 is a longitudinal vertical sectional view through a plunger disclosing an embodiment of the invention.

Figure 2 is a side view of the plunger shown in Figure 1, certain parts being broken away for illustrating how a rod may be mounted in the plunger.

Figure 3 is a bottom plan view of the plunger shown in Figure 1.

Figure 4 is a side view partly in section showing a modified form of plunger with the cylinder of the plunger formed in a plurality of parts.

Referring to the accompanying drawing by numerals, 1 indicates what may be termed the cylinder of the plunger and 2 and 3 the heads. The cylinder 1 may be made from porcelain, brass, china, stone or any desired vitreous material or any material which will resist the action of the acids found in mine water and other water. In the drawing, the cylinder 1 is illustrated as made of porcelain or china, while the heads 2 and 3 are preferably made of bronze, though copper or other material could be used without departing from the spirit of the invention. The head 2 is provided with a recess 4 which may be annular, and in this recess a collar 5 is mounted formed of stainless steel or other desired material which will take up the wear of the washer 6 when the pump is in operation. The collar 5 is formed with a circular aperture or passage-way 7 registering with the circular aperture 8 formed in head 2. A tubular extension or body 9 is carried by the head 2 and is provided with an internally threaded section 10 whereby it may be screwed onto the externally threaded section 11 of the nut 12. The nut 12 is provided with an enlarged portion or head 13 adapted to be fitted into the recess 14 formed in head 3. Preferably the bottom of recess 14 is at a different angle from the lower part of the head 13 so that the parts will pinch at the annular point or edge 15 whereby a water-tight connection is presented. This water-tight joint acts to prevent internal pressure in the vitreous cylinder. This is of some appreciable importance in that vitreous material for the cylinder is very desirable, yet it will not stand much internal pressure and, consequently, this arrangement for securing a tight fit is very desirable. The nut 12 has a bore extending entirely therethrough, said bore having a square section 16 receiving a tool whereby the nut may be screwed firmly in place. Preferably the openings 8 and 17 are trued up or bored out to a true size after the parts have been assembled, thus making a snug fit for the rod 18.

When the parts are being assembled, the cylinder 1 is placed in position on head 2 for instance, and then head 3 is placed in position on top of the cylinder 1. If desired, nut 12 may then be screwed into position or may be screwed into position later. However, after the cylinder 1 and the two heads have been assembled, pressure is brought to bear on the heads so as to force them tightly against the cylinder 1. This pressure is always greater than any pressure which the plunger will be subjected to. While this pressure is being maintained, the nut 12 is screwed down tight and then the pressure or clamping action is removed and the parts are held together by the nut 12 and associated parts. If desired, very thin washers of fiber or other material could be used between the respective heads and the cylinder 1. After the parts have been assembled as just described, the rod 18 may be placed in position so that the cylinder may be connected to the pumping mechanism in the usual manner.

In Figure 4, a slightly modified construction is shown, wherein the parts are identical with those shown in Figure 1 except the cylinder is formed of sections 19 and 20. Preferably a very thin washer 21 is provided between these sections, said washer being of fiber or other desired material. In the drawing, the size of this washer has been exaggerated in order to illustrate the same as usually the washer is about one-sixty-fourth of an inch thick when placed in position, and then when the pressure is brought to bear thereon, it is pressed so tightly as to almost disappear in the sections 19 and 20. Two sections have been shown in Figure 4, but it will be evident that more could be used without departing from the spirit of the invention, the same being mounted in the same way and caused to function in the same way.

Plungers up to a certain size are preferably made with cylinders 1 formed of a single piece but where the plungers are much larger, they are preferably made in rings or sections similar to sections 19 and 20. It will be noted that in both forms of the invention the cylinder does not contact with the extension 19 or any of the parts except at the ends, and that the cylinder is always under tension by reason of the great pressure used in clamping the parts together before nut 12 is tightened. The nut 12 being of metal, and extension 9 being also of metal, cause the threads on sections 10 and 11 to be somewhat resilient and, consequently, there will always be a tension on all of the parts. Preferably a rod 18 is used as shown in Figure 2, though if desired, some other form of rod or connection could be used without departing from the spirit of the invention, as the invention assists in forming the plunger adapted to present the structure shown particularly in Figure 1.

What we claim is:

1. A plunger comprising a body formed of an acid-proof cylinder, a metallic head at each end of the cylinder, one of said heads being formed with an integral tubular extension having threads at one end, said extension extending through the cylinder but out of contact therewith and a nut having a hollow threaded section positioned to screw onto the threaded end of said extension for clamping said heads in position.

2. A pump plunger consisting of a cylindrical block of vitreous material, and metallic means for connecting the block to the moving parts of the pump, said metallic means extending through said block and engaging only the ends thereof, said metallic means comprising an integral tubular extension carried by one head and a hollow nut having a threaded extension fitting against the other head, said nut being screwed into said extension for causing said heads to clamp said block.

3. A pump plunger, comprising a cylinder of vitreous material, a metallic head arranged at each end of said cylinder, one of said heads having a tubular extension projecting to near the opposite head, a hollow nut engaging said opposite head, said hollow nut having a projection screwed into said extension and acting thereon so that said nut will cause said heads to clamp said cylinder, one of said heads having a recess, a wearing collar fitting into said recess and a bolt extending through said nut, said heads and said extension, said bolt having a head overlapping said nut while the opposite end of the bolt is provided with a threaded section projecting beyond said wearing collar, whereby the plunger may be connected to pump mechanism.

4. A pump plunger comprising a cylinder of vitreous material, metallic heads arranged at each end of said cylinder, tubular means for securing said heads to the cylinder, said tubular means being formed with resilient portions for maintaining a tension on the heads so that they will be continually pressing against the ends of the cylinder, said tubular means having an uninterrupted passageway therethrough with the end portions of the passageway of the same size for receiving a bolt.

5. A pump plunger comprising a cylinder of vitreous material, metallic heads, means for connecting said heads to said cylinder, one of said heads having a recess in the center, and a wearing collar removably mounted in said recess for taking up the wear of the power member used in actuating the plunger.

6. A pump plunger comprising a cylinder of vitreous material, a metallic head arranged at each end of said cylinder, and tubular means maintained under tension for connecting said heads, said tubular means being spaced from the inner wall of said cylinder and formed with a power bolt receiving passageway and a wearing collar carried by one of said heads for taking up wear of the power member when power is applied to the plunger.

7. A pump plunger comprising a cylinder of vitreous material, a metallic head arranged at each end of said cylinder, one of said heads having a tubular extension projecting into the cylinder, and a nut carried by the other head, said nut being formed with a threaded portion adapted to be screwed onto said extension for clamping the heads in position.

8. A pump plunger comprising a cylinder of vitreous material formed of one piece throughout, a head mounted on each end of said cylinder, one of said heads having a hollow projection extending to near the other head, and means independent of the heads but acting on said projection and one of said heads for clamping the heads in position.

9. A pump plunger comprising a cylinder of vitreous material, a metallic head arranged at one end of said cylinder formed with a tubular extension projecting into the cylinder, a head arranged at the opposite end of said cylinder formed with a recess having an inclined bottom and a nut threaded onto said tubular extension, said nut being provided with a head having an inclined portion having a different angle to the inclined bottom of said head whereby the inclined portion of the nut will press against the edge of said inclined bottom for producing a water-tight fit while at the same time the nut and tubular extension act to hold the heads firmly against said cylinder.

10. A pump plunger comprising a cylinder of vitreous material, a metallic head arranged at one end of said cylinder formed with a tubular extension, a head arranged at the other end of said cylinder having a bore extending therethrough, and a nut threaded onto said threaded extension and engaging said head for causing the respective heads to pinch against said cylinder, said second mentioned head and said nut being formed with means adapted to substantially interlock for presenting a water-tight connection and thereby prevent internal stresses within said cylinder through leakage of the liquid into the cylinder.

11. A pump plunger, comprising a cylinder of vitreous material, a metallic head arranged at one end of said cylinder with an extension projecting into the cylinder, said extension having a threaded portion, a metallic head arranged at the opposite end of said cylinder formed with a bore extending therethrough and a nut having an enlargement engaging said last-mentioned head and a threaded extension adapted to be screwed onto said threaded portion for firmly holding the heads against said cylinder.

FRED W. MOYER.
FRANK J. RENINGER.